(12) United States Patent
Yamada et al.

(10) Patent No.: US 11,488,210 B2
(45) Date of Patent: Nov. 1, 2022

(54) INFORMATION PROCESSING DEVICE, INFORMATION PROCESSING SYSTEM, PROGRAM, AND INFORMATION PROCESSING METHOD

(71) Applicant: TOYOTA JIDOSHA KABUSHIKI KAISHA, Toyota (JP)

(72) Inventors: Takuji Yamada, Musashino (JP); Jun Tsukamoto, Seto (JP); Kaori Sakai, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/096,266

(22) Filed: Nov. 12, 2020

(65) Prior Publication Data

US 2021/0182909 A1    Jun. 17, 2021

(30) Foreign Application Priority Data

Dec. 12, 2019 (JP) .............................. JP2019-224942

(51) Int. Cl.
G06Q 30/00         (2012.01)
G06Q 30/02         (2012.01)
G05B 19/418        (2006.01)

(52) U.S. Cl.
CPC ..... *G06Q 30/0266* (2013.01); *G06Q 30/0261* (2013.01); *G06Q 30/0264* (2013.01); *G06Q 30/0267* (2013.01)

(58) Field of Classification Search
CPC .......... G06Q 30/0266; G06Q 30/0261; G06Q 30/0264; G06Q 30/0267; G06Q 30/0269; G06Q 30/0265; G09F 21/04
See application file for complete search history.

(56) References Cited

U.S. PATENT DOCUMENTS

| | | | | |
|---|---|---|---|---|
| 7,921,036 B1* | 4/2011 | Sharma | ................... | G06Q 30/02 |
| | | | | 705/14.66 |
| 8,799,461 B2* | 8/2014 | Herz | ................... | G06Q 30/0269 |
| | | | | 709/224 |
| 10,051,411 B2* | 8/2018 | Breed | ................ | G01C 21/3697 |
| 2017/0318433 A1* | 11/2017 | Kitagishi | ................ | H04W 4/23 |

FOREIGN PATENT DOCUMENTS

JP          6027280 B1      11/2016

OTHER PUBLICATIONS

A Data Management Perspective on Vehicular Networks. IEEE. (Year: 2015).*
"Vehicle as a resource (VaaR)". IEEE. 2015. (Year: 2015).*

* cited by examiner

*Primary Examiner* — Maria V Vanderhorst
(74) *Attorney, Agent, or Firm* — Sughrue Mion, PLLC

(57) ABSTRACT

An information processing device has a communication unit and a control unit. The communication unit exchanges information with a terminal device. The control unit controls the communication unit in such a manner as to transmit, to the terminal device, an advertisement associated with a composition category to which a composition of occupants in the moving object based on occupant composition information belongs, when receiving the occupant composition information from the terminal device. The occupant composition information regards the composition of the occupants in the moving object.

16 Claims, 5 Drawing Sheets

INFORMATION PROCESSING DEVICE, INFORMATION PROCESSING SYSTEM, PROGRAM, AND INFORMATION PROCESSING METHOD

CROSS-REFERENCE TO RELATED APPLICATION

This application claims priority to Japanese Patent Application No. 2019-224942 filed on Dec. 12, 2019, incorporated herein by reference in its entirety.

BACKGROUND

1. Technical Field

The present disclosure relates to an information processing device, an information processing system, a program, and an information processing method.

2. Description of Related Art

The provision of advertisements to occupants in a moving object such as a vehicle has been discussed. For example, it has been proposed to make a changeover between methods of providing advertisements, based on a degree of a driver's wiggle room that is calculated based on at least one of the driver's condition and a surrounding situation (see Japanese Patent No. 6027280 (JP 6027280 B)).

SUMMARY

However, provided information may not necessarily be what is desired by users, and may bother the users. Also, there is room for improvement in enhancing the effects of advertisements.

The present disclosure has been made in consideration of the foregoing circumstances. It is an object of the present disclosure to provide an information processing device, an information processing system, a program, and an information processing method that provide advertisements that can interest users in a moving object.

An information processing device according to one aspect of the present disclosure is equipped with a communication unit that exchanges information with a terminal device utilized in a moving object, and a control unit that controls the communication unit in such a manner as to transmit, to the terminal device, an advertisement associated with a composition category to which a composition of occupants in the moving object based on occupant composition information on the composition of the occupants in the moving object belongs, when receiving the occupant composition information from the terminal device.

An information processing system according to another aspect of the present disclosure is equipped with an information processing device having a communication unit that exchanges information with a terminal device utilized in a moving object, and a control unit that controls the communication unit in such a manner as to transmit, to the terminal device, an advertisement associated with a composition category to which a composition of occupants in the moving object based on occupant composition information on the composition of the occupants in the moving object belongs, when receiving the occupant composition information from the terminal device, and the terminal device.

A program according to still another aspect of the present disclosure causes a computer to perform operations including conducting a search for an advertisement associated with a composition category to which a composition of occupants in a moving object based on features of the occupants in the moving object belongs, when obtaining the features, and outputting the advertisement found through the search.

An information processing method according to still another aspect of the present disclosure is carried out by a computer. The computer receives, from a terminal device, occupant composition information on a composition of occupants in a moving object, and transmits, to the terminal device, an advertisement associated with a composition category to which the composition of the occupants in the moving object based on the occupant composition information belongs.

The information processing device, the information processing system, the program, and the information processing method according to the aspects of the present disclosure provide advertisements that can interest users in a moving object.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Embodiments of the present disclosure will be described hereinafter with reference to the drawings.

Figure 1:
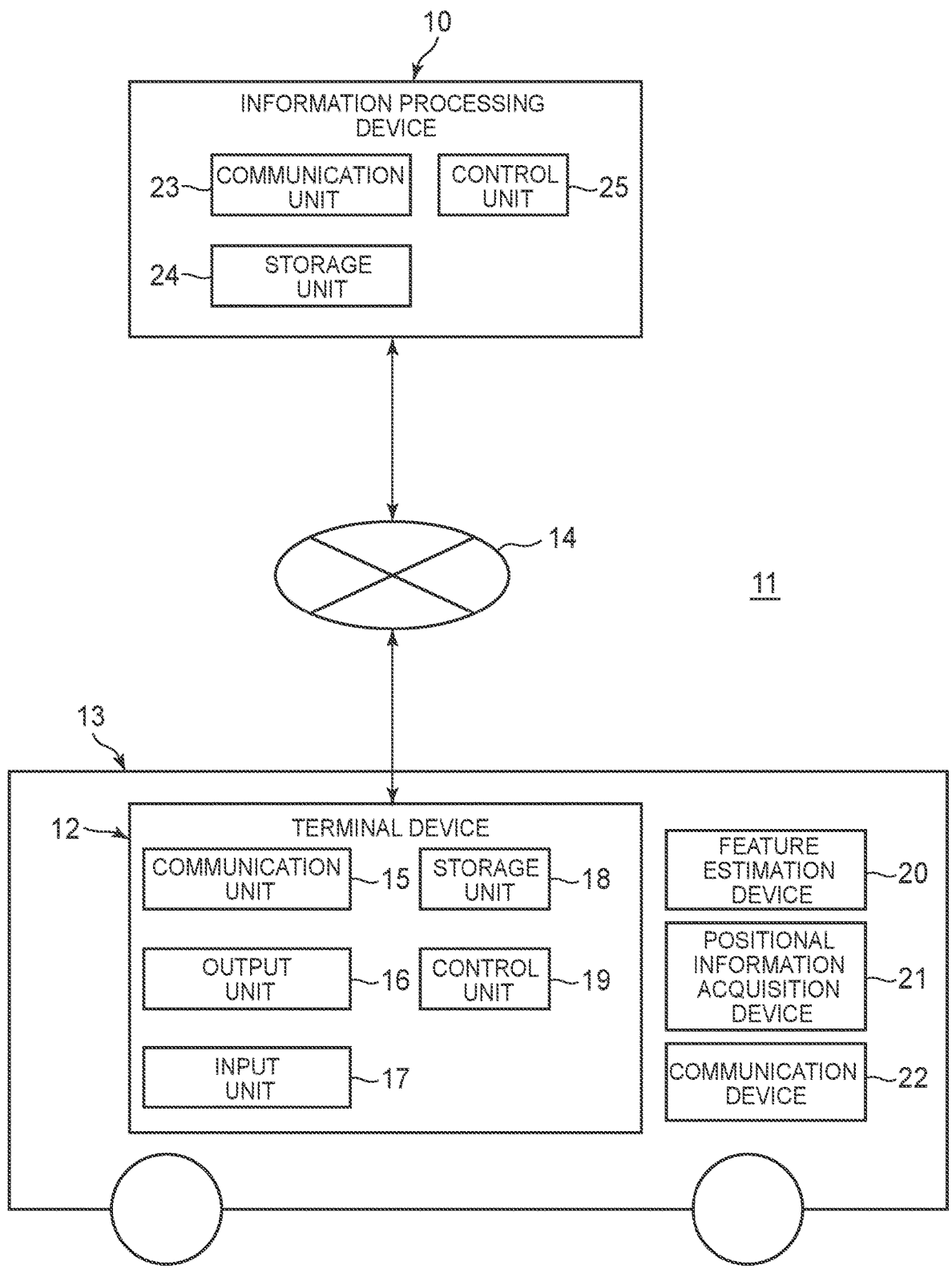
FIG. 1 is a block diagram showing the overall configuration of an information processing system including an information processing device according to the first embodiment of the present disclosure.

The outline of an information processing system 11 including an information processing device 10 according to the first embodiment of the present disclosure will be described with reference to FIG. 1. The information processing system 11 is equipped with a terminal device 12 and the information processing device 10.

The terminal device 12 is, for example, a dedicated electronic device such as a car navigation device that is utilized after being mounted on a moving object 13 such as a vehicle that runs on a road surface, but is not limited thereto. The terminal device 12 may be a general-purpose electronic device such as a portable terminal device, for example, a smartphone. The information processing device 10 includes a single server device or a plurality of server devices that can communicate with one another. For the sake of simple explanation, the single terminal device 12 is shown in FIG. 1. However, the information processing system 11 may be equipped with one or more terminal devices 12.

As the outline of the first embodiment, the terminal device 12 obtains a composition of occupants in the moving object 13 utilizing the terminal device 12, and transmits occupant composition information to the information processing device 10. When receiving the occupant composition information, the information processing device 10 extracts advertisements having, as propaganda targets thereof, a composition category to which the composition of the occupants based on the occupant composition information belongs. The information processing device 10 transmits the extracted advertisements to the terminal device 12. The terminal device 12 notifies the occupants of the advertisements by outputting the received advertisements in the moving object 13.

Next, the respective components of the information processing system 11 will be described in detail.

The terminal device 12 is equipped with a communication unit 15, an output unit 16, an input unit 17, a storage unit 18, and a control unit 19.

The communication unit 15 includes a communication module that establishes communication via a dedicated line or an in-vehicle network such as a controller area network (CAN) of the moving object 13. The communication unit 15 may include, for example, a communication module corresponding to a short-distance wireless communication standard such as Bluetooth (®). The communication unit 15 may include a communication module that is connected to a network 14. For example, the communication unit 15 may include a communication module corresponding to a moving object communication standard such as 4th Generation (4G) or 5th Generation (5G).

In the first embodiment, the terminal device 12 is connected to devices mounted in the moving object 13, such as a feature estimation device 20 and a positional information acquisition device 21, via the communication unit 15, and exchanges information therewith.

The feature estimation device 20 includes, for example, a camera for imaging the occupants in the moving object 13, and a control unit. The feature estimation device 20 estimates, based on an image photographed by the camera, features of each of the occupants in the image, such as the sex and age of each of the occupants. The feature estimation device 20 may identify features of each of the occupants in the image, such as the clothes of each of the occupants. The feature estimation device 20 may identify a position of each of the occupants in the moving object 13 as well as the features of each of the occupants. The feature estimation device 20 transmits information including the position of each of the occupants as well as the features of each of the occupants to the terminal device 12. The feature estimation device 20 may be built in the terminal device 12.

The positional information acquisition device 21 includes one or more receivers corresponding to an arbitrary satellite positioning system. The positional information acquisition device 21 may include, for example, a global positioning system (GPS) receiver. The positional information acquisition device 21 acquires information on a measured value of a position of the terminal device 12, and transmits this information to the terminal device 12. The positional information acquisition device 21 periodically acquires and transmits the measured value. The positional information acquisition device 21 may be built in the terminal device 12.

Besides, the terminal device 12 is connected to the network 14 via the communication unit 15 or via the communication unit 15 and the communication device 22 of the moving object 13, and transmits and receives a great variety of pieces of information via the network 14. The communication device 22 is, for example, a dedicated in-vehicle communicator. In order to be connected to the network 14, the communication device 22 may include a communication module corresponding to a moving object communication standard such as 4th Generation (4G) or 5th Generation (5G).

Besides, the terminal device 12 may be connected to terminal devices carried by the occupants in the moving object 13, and exchange a great variety of pieces of information therewith, through short-distance wireless communication via the communication unit 15. The terminal device 12 may receive information on the features of each of the occupants such as the sex, age, name, and profession of each of the occupants from the terminal device carried by each of the occupants through, for example, short-distance wireless communication.

In transmitting the information via the network 14, the communication unit 15 may add identification information on the terminal device 12 to the information. The identification information on the terminal device 12 is information that allows the terminal device 12 to be uniquely identified in the information processing system 11.

The output unit 16 includes one or more interfaces that output information and notify a user thereof. For example, the output unit 16 is a display that outputs information visually, a speaker that outputs information acoustically, or the like, but is not limited thereto. The output unit 16 may have a plurality of displays, and the displays may be provided at different positions in the moving object 13 respectively. The displays may be provided at, for example, at least two of a position suited for visual recognition by a driver and a passenger in front seats such as a dashboard, a position suited for visual recognition by passengers right behind a driver's seat and a front passenger seat, such as back surfaces of the driver's seat and the front passenger seat, and a position suited for visual recognition by passengers in rear seats, such as a ceiling in the vicinity of seatbacks of the front seats, respectively. Alternatively, the terminal device 12 may transmit information to an external display device, and cause the external display device to output the information.

The input unit 17 includes one or more interfaces for detecting the user's input. The input unit 17 includes, for example, a physical key, a capacitance key, and a touch screen provided integrally with the displays of the output unit 16.

The storage unit 18 is a semiconductor memory, a magnetic memory, an optical memory, or the like, but is not limited thereto. The storage unit 18 may function as, for example, a main storage device, an auxiliary storage device, or a cash memory. The storage unit 18 stores arbitrary pieces of information used to operate the terminal device 12. The storage unit 18 may store, for example, a system program, an application program, or the like. The information stored in the storage unit 18 may be received from the network 14 via, for example, the communication unit 15, and may be updatable.

The control unit 19 includes one or more processors. In the first embodiment, each of "the processors" is a general-purpose processor, or a dedicated processor specialized for a specific process, but is not limited thereto. The dedicated processor may include an application specific integrated circuit (ASIC). The control unit 19 may include a programmable logic device (PLD). The PLD may include a field-programmable gate array (FPGA). The control unit 19 controls the operation of the entire terminal device 12.

The control unit 19 causes the feature estimation device 20 to estimate the features of the occupants. The control unit 19 causes the feature estimation device 20 to estimate the features of the occupants cyclically, regularly, or after the activation of the terminal device 12. The control unit 19 receives information on the estimated features of the occupants as well as the positions of the occupants in the moving object 13. The control unit 19 stores the received information into the storage unit 18.

In the case where short-distance wireless communication with the terminal device is possible, in other words, in the case where each of the occupants in the moving object 13 has a terminal device, the control unit 19 requests the terminal device to transmit information on the features of each of the occupants, via the communication unit 15. When receiving information on the features of each of the occupants in response to the request, the control unit 19 stores the information into the storage unit 18.

The control unit 19 generates occupant composition information including at least the features of the occupants stored in the storage unit 18, after activation of the terminal device 12. The occupant composition information regards the composition of the occupants in the moving object 13, and includes at least information that can classify the composition of the occupants in the moving object 13 into one of a plurality of composition categories. The occupant composition may be the composition of a single occupant or the composition of a plurality of occupants. The composition categories may include categories for a single occupant, and categories for a plurality of occupants.

The composition categories may be single-stratum composition categories, or multi-stratum composition categories. The single-stratum composition categories may be composition categories for broad classification, for example, "family", "friends", "couple", and "colleagues". Besides, the multi-stratum composition categories may include first composition categories for broad classification as is the case with the single-stratum composition categories, and second composition categories for more detailed classification. The second composition categories may serve to classify "family" as one of the foregoing first composition categories more finely into, for example, "parents and child", "grandparents and child", "grandparents, parents and child", "father and son", "mother and daughter", and "brothers".

Besides, the control unit 19 may classify the composition of the occupants into any one of the composition categories based on information indicating the features of the occupants stored in the storage unit 18, and generate the composition category into which the composition of the occupants is classified, as occupant composition information.

For example, when the occupants are an adult man, an adult woman, and a child or an infant, the control unit 19 classifies the composition of the occupants into the composition category "family", and further into the composition category "parents and child". For example, when the occupants are an adult man and a boy, the control unit 19 classifies the composition of the occupants into the composition category "family", and further into the composition category "father and son". For example, when the occupants are a plurality of adults, the control unit 19 classifies the composition of the occupants into the composition category "friends". For example, when the occupants are an adult man and an adult woman, the control unit 19 classifies the composition of the occupants into the composition category "couple".

The control unit 19 may add the clothes of the occupants to the composition categories. The clothes are, for example, everyday clothes, sports clothes, semi-ceremonial or ceremonial clothes, and work clothes.

The control unit 19 controls the communication unit 15 in such a manner as to transmit, to the information processing device 10, occupant composition information including information on the features of the occupants or occupant composition information indicating a composition category. In the case where the output unit 16 includes a plurality of displays, the control unit 19 may control the communication unit 15 in such a manner as to transmit, to the information processing device 10, information indicating the positions of the respective occupants in the moving object 13 and the positions of the respective displays, as well as the occupant composition information.

When the input unit 17 detects the user's input about a destination of the occupants, the control unit 19 stores information on the destination into the storage unit 18. The control unit 19 stores information on the position of the terminal device 12 received from the positional information acquisition device 21 into the storage unit 18.

The control unit 19 may generate a scheduled running route recommendable to the moving object 13 as well as a scheduled travel time, based on the destination and the most recently received position of the terminal device 12. The control unit 19 may cause the output unit 16 to output the generated route. The control unit 19 may control the communication unit 15 in such a manner as to transmit, to the information processing device 10, information on the generated scheduled running route as well as the destination and the scheduled travel time. In the case where the position of a home is stored in advance in the storage unit 18, the control unit 19 determines whether or not the destination is the home. In the case where the destination is the home, the control unit 19 controls the communication unit 15 in such a manner as to further transmit, to the information processing device 10, information indicating that the destination is the home.

Alternatively, the control unit 19 may control the communication unit 15 in such a manner as to transmit, to the information processing device 10, a route generation request including information on the destination and the most recently received position of the terminal device 12. The control unit 19 may cause the output unit 16 to output a route received from the information processing device 10, based on the request. As is the case with the configuration in which the scheduled running route is generated, in the case where the destination is the home, the control unit 19 controls the communication unit 15 in such a manner as to further transmit, to the information processing device 10, information indicating that the destination is the home.

Even in the case where the user's input of a destination has not been detected, the control unit 19 may estimate the destination, based on the history of the position of the terminal device 12 after activation of the terminal device 12, in other words, a route along which the moving object has traveled. The control unit 19 estimates the destination by, for example, comparing the route along which the moving object has traveled with a route followed in the past by the moving object as stored in the storage unit 18. The control unit 19 may control the communication unit 15 in such a manner as to transmit information on the estimated destination to the information processing device 10.

The control unit 19 determines, based on the history of the destinations stored in the storage unit 18, that each of the frequently set destinations is within a living sphere of a main driver of the moving object 13. The control unit 19 estimates the living sphere of the main driver, based on the destinations determined as being within the living sphere. The control unit 19 may estimate, as the living sphere, a region surrounded by three or more of the destinations determined as being within the living sphere. The control unit 19 may control the communication unit 15 in such a manner as to transmit, to the information processing device 10, information on a result of the determination as to whether or not each of the destinations is within the living sphere, as well as each of the destinations. The control unit 19 may control the communication unit 15 in such a manner as to transmit, to the information processing device 10, information on the history of living spheres or destinations instead of the result of the determination.

When receiving information on an advertisement from the information processing device 10 after transmitting occupant composition information, the control unit 19 controls the output unit 16 in such a manner as to output the advertisement.

The information processing device 10 is equipped with a communication unit 23, a storage unit 24, and a control unit 25.

The communication unit 23 includes a communication module that is connected to the network 14. For example, the communication unit 23 includes a communication module corresponding to a moving object communication standard such as 4th Generation (4G) or 5th Generation (5G). In the first embodiment, the information processing device 10 is connected to the network 14 via the communication unit 23, and exchanges information with, for example, the terminal device 12. For example, in transmitting information via the network 14, the communication unit 23 may add identification information on the information processing device 10 to the information. The identification information on the information processing device 10 is information that allows the information processing device 10 to be uniquely identified in the information processing system 11.

The concrete configuration and function of the storage unit 24 are identical to those of the storage unit 18 of the terminal device 12. The storage unit 24 stores, for example, an arbitrary piece of information used to operate the information processing device 10. The storage unit 24 stores information on advertisements distributed in the network 14 at least in association with at least one composition category. The advertisements may be associated with a single composition category or a plurality of composition categories.

The advertisements are distributed from a great variety of server devices via the network 14. The advertisements may be received from a great variety of server devices, through a search conducted by the information processing device 10. The advertisements are, for example, advertisements on stores and facilities. The advertised stores are, for example, stores selling arbitrary pieces of merchandise, and stores offering arbitrary services. The advertised facilities are, for example, facilities holding trial events for arbitrary pieces of merchandise or services, and events for distributing arbitrary gift products.

The composition categories associated with the advertisements are, for example, groups to be made known through the advertisements, which are determined by being manually input by advertisers or through machine learning. For advertisements aiming mainly at families as desirable potential customers, for example, those about stores or facilities such as family restaurants and housing exhibition halls, the composition category associated with the advertisements is "family". For advertisements aiming mainly at couples as desirable potential customers, for example, those about stores or facilities such as coffee shops, jewelry stores, and movie theaters showing romantic movies, the composition category associated with the advertisements is "couple". For advertisements aiming mainly at friends as desirable potential customers, for example, those about stores or facilities such as family restaurants and classrooms offering lectures on hobbies, the composition category associated with the advertisements is "friends". For advertisements aiming mainly at company employees as desirable potential customers, for example, those about stores such as catering establishments, the composition category associated with the advertisements is "colleagues".

The storage unit 24 may store information on the advertisements in association with combinations of composition categories and clothes of the occupants. The combinations are determined, for example, by being manually input by the advertisers or through machine learning. For example, in the case where the advertisements are about posh catering establishments, the combinations are "family dressed in semi-ceremonial or ceremonial clothes", "couple dressed in semi-ceremonial or ceremonial clothes", and the like. Besides, for example, in the case where the advertisements are about popular catering establishments, the combinations are "family dressed in normal clothes", "friends dressed in normal clothes", and the like. Besides, for example, in the case where the advertisements are about sports equipment stores, the combinations are "family including at least one member dressed in sports clothes", "friends at least one of whom is dressed in sports clothes", and the like. Besides, for example, in the case where the advertisements are about bathhouses and stores offering massage services, the combinations are "colleagues dressed in work clothes", and the like.

The storage unit 24 may store information on the advertisements in association with a distribution range. The distribution range associated with the advertisements is, for example, a locational range that is determined by the advertisers and in which the advertisements are desired to be distributed.

The storage unit 24 may store information on the advertisements in association with information indicating whether or not the advertisements target the living sphere. The advertisements targeting the living sphere are, for example, advertisements on stores offering pieces of merchandise that are generally purchased within the living sphere of clients. The advertisements targeting the living sphere relate to, for example, pieces of merchandise for everyday life such as food products, books, and miscellaneous goods for everyday life, and services for everyday life such as rental services.

The storage unit 24 may store information on the advertisements in association with customer segments as propaganda targets. The customer segments as the propaganda targets associated with the advertisements are determined by being manually input by the advertisers or through machine learning. The customer segments as the propaganda targets associated with the advertisements are, for example, infants, elementary school students, junior school students, high school students, university students, adults in their 20's to 30's, adults in their 40's to 50's, adults in their 60's or over, males, females, and the like.

The concrete configuration of the control unit 25 is identical to that of the control unit 19 of the terminal device 12. The control unit 25 controls the operation of the entire information processing device 10.

In receiving occupant composition information from the terminal device 12, the control unit 25 stores occupant composition information into the storage unit 24. The control unit 25 obtains a composition category to which the composition of the occupants in the moving object 13 belongs, based on the received occupant composition information. For example, when receiving the occupant composition information including information on the features of the occupants and information on attributes, the control unit 25 obtains a composition category by classifying the composition of the occupants in the moving object 13 into any one of the composition categories, based on the occupant composition information. Alternatively, for example, when receiving the composition category into which the composition of the occupants is classified, as occupant composition information, the control unit 25 obtains the composition category through reception. The control unit 25 extracts advertisements associated with the obtained composition category, from the storage unit 24.

When receiving a destination from the terminal device 12 to which the occupant composition information has been transmitted, the control unit 25 may further extract advertisements associated with a distribution range including the destination, in other words, advertisements around the destination, from the extracted advertisements. When receiving a determination result indicating that the destination is included in the living sphere as well as the destination, the control unit 25 may further extract advertisements with which information indicating that the living sphere is targeted is associated, from the extracted advertisements. When receiving a determination result indicating that the destination is not included in the living sphere, as well as the destination, the control unit 25 may further extract advertisements with which information indicating that the living sphere is targeted is not associated, from the extracted advertisements.

Furthermore, when receiving the scheduled running route as well as the destination, the control unit 25 determines whether or not part of the scheduled running route includes at least one freeway. In the case where at least one freeway is included, the control unit 25 may extract advertisements on dedicated rest stops along the freeway within the range of the scheduled running route, among the advertisements extracted as advertisements associated with the composition categories, apart from the advertisements around the destination. The dedicated rest stops along the freeway are, for example, service areas or parking areas in Japan.

Furthermore, when receiving information indicating that the destination is a home as well as the destination and the scheduled running route, the control unit 25 determines that the moving object 13 utilizing the terminal device 12 is traveling home. In the case where the moving object 13 is traveling home, the control unit 25 may extract advertisements associated with the distribution range including at least one place along the scheduled running route, in other words, advertisements around a homecoming route, from the advertisements extracted as those associated with the composition category, apart from the advertisements around the destination.

Furthermore, when receiving information indicating the positions of the respective occupants and the positions of the displays as well as occupant composition information, the control unit 25 stores the information into the storage unit 24. The control unit 25 estimates the occupant who recognizes the information output from each of the displays, based on the position of each of the occupants and the position of each of the displays. The control unit 25 may estimate, for example, the occupant closest to the position of each of the displays, as the occupant who recognizes the information output from the display. The control unit 25 may further extract advertisements to be output from each of the displays, from the advertisements associated with the composition category, based on the features of the occupant who recognizes the information from each of the displays. For example, in the case where the composition category is "family" and the occupant who recognizes the information from an arbitrary one of the displays is a child, advertisements that interest children are further extracted from the advertisements targeting families, as advertisements to be output from the display.

The control unit 25 controls the communication unit 23 in such a manner as to transmit information on the extracted advertisements to the terminal device 12 to which the occupant composition information has been transmitted. In receiving a scheduled travel time from the terminal device 12 to which the occupant composition information has been transmitted, the control unit 25 may stop transmitting the advertisements when the scheduled travel time is equal to or shorter than a threshold. The transmission may be stopped based on, for example, the stop of the operation of extracting advertisements, or the stop of the operation of transmitting the extracted advertisements. The threshold is determined as, for example, a short-distance travel time that makes one find it bothersome to distribute advertisements.

When receiving a route generation request from an arbitrary one of the terminal devices 12, the control unit 25 generates a scheduled running route recommendable to the moving object 13, as well as a scheduled travel time. The control unit 25 transmits information on the generated scheduled running route and the generated scheduled travel time to the terminal device 12. The control unit 25 uses the generated scheduled running route and the generated scheduled travel time to extract the foregoing advertisements. The control unit 25 uses a determination as to whether or not there is at least one dedicated rest stop along the freeway within the range of the scheduled running route, to extract the foregoing advertisements.

When receiving the history of living spheres or destinations as well as a new destination, the control unit 25 determines whether or not the new destination is within a living sphere. The control unit 25 uses a result of the determination to extract the foregoing advertisements.

Figure 2:
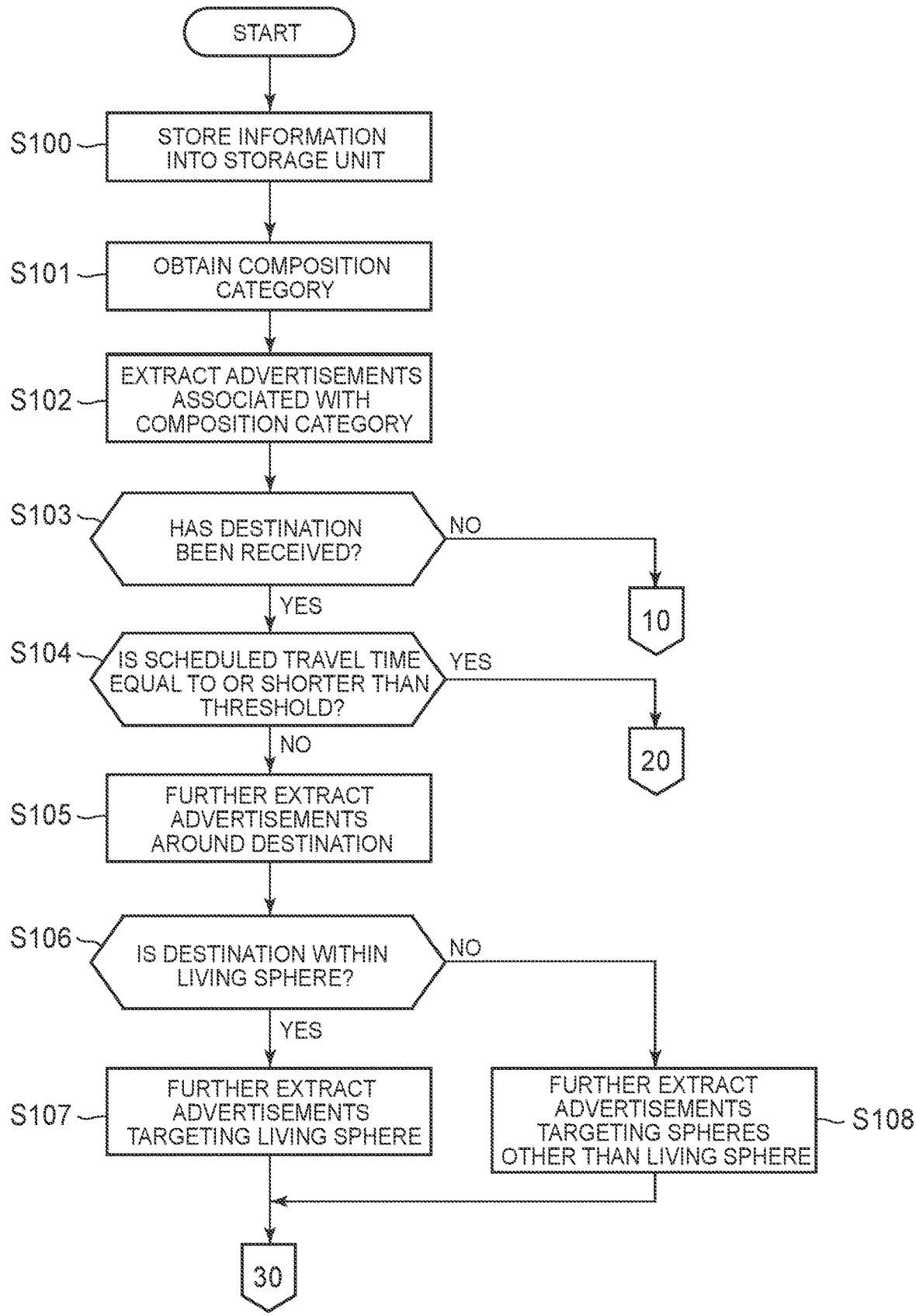
FIG. 2 is a first flowchart of an advertisement transmission process that is performed by a control unit of the information processing device of FIG. 1 in the first embodiment.
Figure 3:
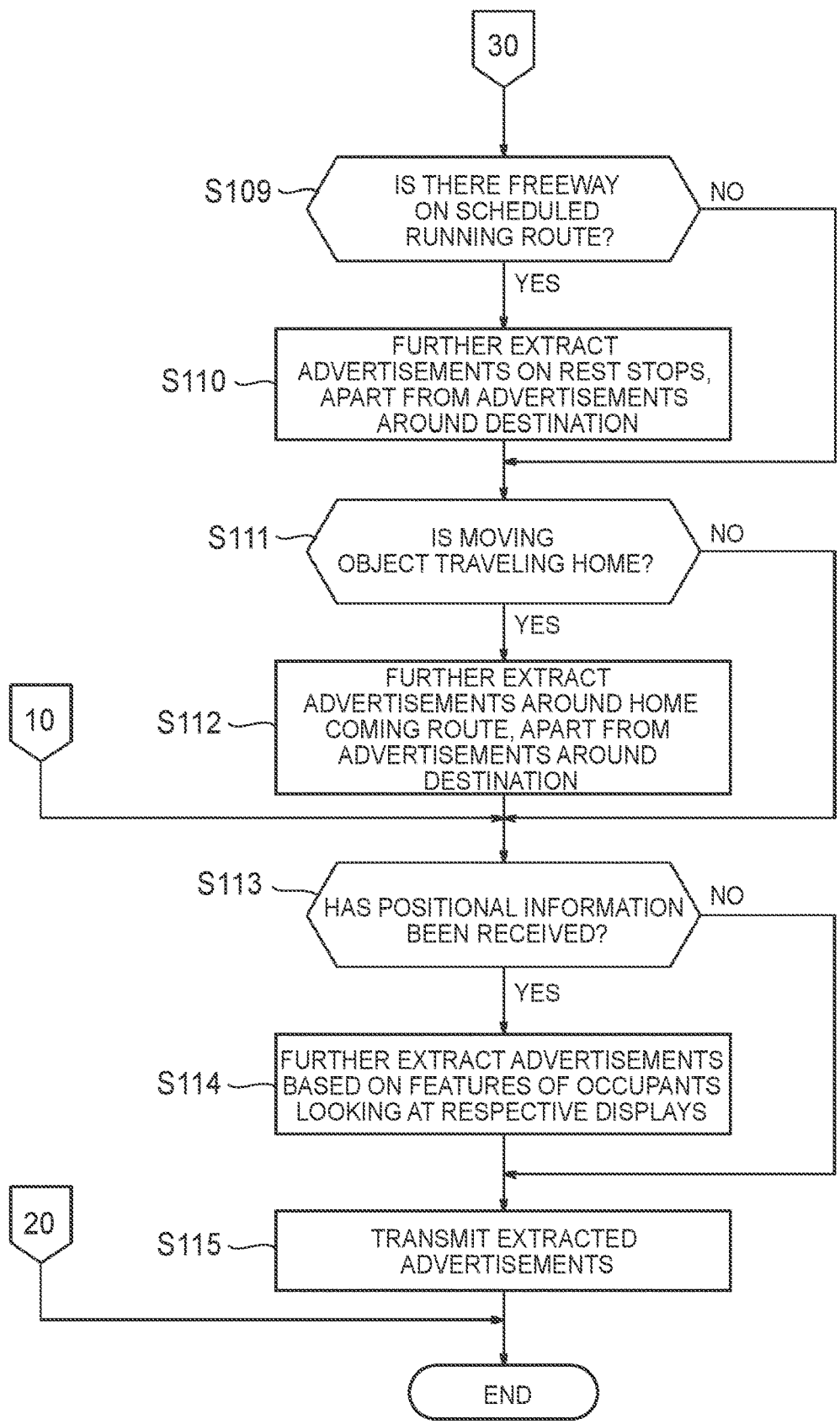
FIG. 3 is a second flowchart of the advertisement transmission process that is performed by the control unit of the information processing device of FIG. 1 in the first embodiment.

Next, an advertisement transmission process that is performed by the control unit 25 of the information processing device 10 in the first embodiment will be described through the use of flowcharts of FIGS. 2 and 3. The advertisement transmission process is started when receiving occupant composition information from an arbitrary one of the terminal devices 12.

In step S100, the control unit 25 stores occupant composition information into the storage unit 24. After this storage, the process proceeds to step S101.

In step S101, the control unit 25 obtains a composition category to which the composition of the occupants in the moving object 13 utilizing the terminal device 12 belongs, based on the occupant composition information stored in step S100. After the composition category is obtained, the process proceeds to step S102.

In step S102, the control unit 25 extracts advertisements associated with the composition category obtained in step S101, from the storage unit 24. After this extraction, the process proceeds to step S103.

In step S103, the control unit 25 determines whether or not a destination has been received from the terminal device 12. If the destination has been received, the process proceeds to step S104. If the destination has not been received, the process proceeds to step S113.

In step S104, the control unit 25 determines whether or not a scheduled travel time to the destination received in step S103 is equal to or shorter than a threshold. If the scheduled travel time is not equal to or shorter than the threshold, the process proceeds to step S105. If the scheduled travel time is equal to or shorter than the threshold, the advertisement transmission process is ended.

In step S105, the control unit 25 further extracts advertisements around the destination of which the reception has been confirmed in step S103, from the advertisements extracted in step S102. After this extraction, the process proceeds to step S106.

In step S106, the control unit 25 determines whether or not the destination of which the reception has been confirmed in step S103 is included in a living sphere. If the destination is included in the living sphere, the process proceeds to step S107. If the destination is not included in the living sphere, the process proceeds to step S108.

In step S107, the control unit 25 further extracts advertisements with which information indicating that the advertisements target the living sphere is associated, from the advertisements extracted in step S105. After this extraction, the process proceeds to step S109.

In step S108, the control unit 25 further extracts advertisements with which information indicating that the advertisements target the living sphere is not associated, from the advertisements extracted in step S105. After this extraction, the process proceeds to step S109.

In step S109, the control unit 25 determines whether or not the scheduled running route to the destination of which the reception has been confirmed in step S103 includes at least one freeway. If the scheduled running route includes at least one freeway, the process proceeds to step S110. If the scheduled running route does not include any freeway, the process proceeds to step S111.

In step S110, the control unit 25 further extracts advertisements on rest stops along the freeway on the scheduled running route, from the advertisements extracted in step S102. That is, the control unit 25 also extracts the advertisements on the rest stops, apart from the advertisements around the destination extracted in step S105. After this extraction, the process proceeds to step S111.

In step S111, the control unit 25 determines whether or not the moving object 13 utilizing the terminal device 12 is traveling home. If the moving object 13 is traveling home, the process proceeds to step S112. If the moving object 13 is not traveling home, the process proceeds to step S113.

In step S112, the control unit 25 further extracts advertisements around the homecoming route, from the advertisements extracted in step S102. That is, the control unit 25 also extracts the advertisements around the homecoming route, apart from the advertisements around the destination extracted in step S105. After this extraction, the process proceeds to step S113.

In step S113, the control unit 25 determines whether or not information indicating the positions of the respective occupants and the positions of the displays as well as occupant composition information has been received. If the information has been received, the process proceeds to step S114. If the information has not been received, the process proceeds to step S115.

In step S114, the control unit 25 further extracts advertisements for the respective displays, from the advertisements extracted in at least one of steps S102, S105, S107, S108, S110, and S112, based on the features of the occupants who recognize the information from the respective displays. After this extraction, the process proceeds to step S115.

In step S115, the control unit 25 controls the communication unit 23 in such a manner as to transmit the advertisements extracted in steps S102, S105, S107, S108, S110, S112, and S114 to the terminal device 12. After this transmission, the advertisement transmission process is ended.

When receiving occupant composition information from the terminal device 12, the information processing device 10 according to the first embodiment configured as described above transmits, to the terminal device 12, advertisements associated with the composition category to which the composition of the occupants in the moving object 13 based on the occupant composition information belongs. In the moving object 13, in general, the type of advertisements that interest the occupants is considered to change depending on the composition thereof at that time. In view of this phenomenon, the information processing device 10 distributes advertisements that can interest the occupants in the moving object 13, namely, users, through the foregoing configuration.

Besides, when receiving the destination of the moving object 13, the information processing device 10 according to the first embodiment transmits advertisements around the destination to the terminal device 12. The occupants in the moving object 13 generally head first toward the destination, and are considered to be more interested in advertisements on stores and the like around the destination than in advertisements on stores on the route to the destination. Therefore, the information processing device 10 distributes advertisements that can interest the occupants more, through the foregoing configuration.

Besides, the information processing device 10 according to the first embodiment stops transmitting advertisements when the scheduled travel time is equal to or shorter than a threshold. Owing to this configuration, the information processing device 10 stops distributing advertisements in a situation where the occupants are unlikely to desire the distribution of advertisements, and hence can prevent the occupants from feeling uncomfortable.

Besides, the information processing device 10 according to the first embodiment transmits, to the terminal device 12, advertisements that differ depending on whether or not the destination is within the living sphere of the occupants. The targets of the advertisements that interest the occupants traveling in the moving object 13 are considered to change depending on whether the occupants travel within the living sphere or out of the living sphere. For example, advertisements on everyday food products, commodities, and the like are considered to be in demand while the occupants travel within the living sphere, and advertisements on extraordinary events, extraordinary food products, and the like are considered to be in demand while the occupants travel out of the living sphere. Therefore, owing to the foregoing configuration, the information processing device 10 distributes advertisements that can interest the occupants more.

Besides, in the case where the scheduled running route includes at least one freeway, the information processing device 10 according to the first embodiment transmits advertisements on dedicated rest stops along the freeway to the terminal device 12. When a freeway is passed, the occupants are generally assumed to travel a long distance. In traveling a long distance, the occupants may temporarily drop in at rest stops. Therefore, the occupants are considered to be interested in the advertisements on the rest stops even when there is no rest stop around the destination. Therefore, owing to the foregoing configuration, the information processing device 10 reduces the possibility of a failure to distribute advertisements that can interest the occupants.

Besides, the information processing device 10 according to the first embodiment transmits advertisements to be output from the displays respectively to the terminal device 12, based on the information indicating the features of the occupants who recognize the pieces of information output from the displays of the moving object 13 respectively. The type of the advertisements that interest the occupants is considered to change depending on the composition of the occupants. However, even among the advertisements of that type, the advertisements that interest each of the occupants are considered to be different. Therefore, owing to the foregoing configuration, the information processing device 10 can distribute advertisements that can interest the occupants who visually recognize the displays, to the terminal device 12 that outputs advertisements to the displays respectively.

Besides, while the moving object 13 is traveling home, the information processing device 10 according to the first embodiment transmits advertisements around the route to the terminal device 12. While traveling home, the moving object 13 may drop in somewhere before reaching the home, so advertisements around the homecoming route are considered to attract interest. Therefore, owing to the foregoing configuration, the information processing device 10 reduces the possibility of a failure to distribute advertisements that can interest the occupants.

Next, the outline of the information processing system 11 including the terminal device 12 that executes a program according to the second embodiment of the present disclosure will be described. In the second embodiment, the operation after detection of occupant composition information in the terminal device 12 is different from that of the first embodiment. The second embodiment will be described hereinafter, focusing on the difference from the first embodiment. Incidentally, components that are identical in structure to those of the first embodiment will be described with the same reference symbols assigned thereto respectively.

In the second embodiment as well as the first embodiment, the information processing system 11 is equipped with the terminal device 12 and the information processing device 10. As the outline of the second embodiment, the terminal device 12 obtains a composition of the occupants in the moving object 13 utilizing the terminal device 12, based on information from the camera or the like in the moving object 13, as features of the occupants. Furthermore, the terminal device 12 conducts a search for advertisements of which the target of propaganda is a composition category to which the composition of the occupants based on the features of the occupants belongs, from the information processing device 10 via the storage unit 18 of the terminal device 12 or the network 14. The terminal device 12 notifies the occupants of the advertisements acquired through the search, by outputting the advertisements in the moving object 13.

As is the case with the first embodiment, the terminal device 12 is equipped with the communication unit 15, the output unit 16, the input unit 17, the storage unit 18, and the control unit 19. The communication unit 15, the output unit 16, the input unit 17, the storage unit 18, and the control unit 19 are identical in structure to those of the first embodiment respectively.

Unlike the first embodiment, the control unit 19 obtains the composition category to which the composition of the occupants in the moving object 13 belongs, based on the features of the occupants stored in the storage unit 18, after activation of the terminal device 12. The control unit 19 conducts a search for advertisements with which the obtained composition category is associated. In the case where advertisements with which a specific composition category is associated are received in advance and stored into the storage unit 18, the control unit 19 may conduct the search from the storage unit 18. The control unit 19 may conduct the search from advertisements that can be distributed by a plurality of information processing devices 10 via the network 14, after obtaining the composition category.

Unlike the first embodiment, when the input unit 17 detects a user's input of a destination of the occupants or when the destination is estimated based on a route along which the moving object has traveled, the control unit 19 conducts a search for advertisements, with a condition of being around the destination added to a search condition. Unlike the first embodiment, the control unit 19 conducts a search for advertisements with a condition of targeting the living sphere or a condition of not targeting the living sphere added to the search condition, depending on whether or not the destination is included in the living sphere.

Unlike the first embodiment, the control unit 19 determines whether or not part of a scheduled running route includes at least one freeway. If part of the scheduled running route includes at least one freeway, the control unit 19 conducts a search for advertisements with dedicated rest stops along the freeway within the range of the scheduled running route added to the search condition, apart from the condition of being around the destination.

Unlike the first embodiment, when the destination is a home, in other words, when it can be determined that the moving object 13 is traveling home, the control unit 19 conducts a search for advertisements with a condition of being around the homecoming route added to the search condition, apart from the condition of being around the destination and the rest stops along the freeway.

Unlike the first embodiment, when the output unit 16 has a plurality of displays, the control unit 19 reads out a position of each of the displays from the storage unit 18, and receives a position of each of the occupants from the feature estimation device 20. The control unit 19 estimates the occupant who recognizes information output from each of the displays, based on the position of each of the occupants and the position of each of the displays. The control unit 19 conducts a search for advertisements for each of the displays with the features of the occupant who recognizes information from each of the displays added to the search condition. The control unit 19 causes each of the displays to display the advertisements found through the search.

Unlike the first embodiment, the control unit 19 causes the output unit 16 to output the advertisements found through the search. Unlike the first embodiment, in the case where the output unit 16 has a plurality of displays, the control unit 19 causes each of the displays to output advertisements found through the search for each of the displays. The control unit 19 generates a scheduled travel time based on the destination, and stops outputting advertisements when the scheduled travel time is equal to or shorter than a threshold.

By being managed by advertisers or business operators engaged in advertising, the information processing device 10 distributes a plurality of advertisements associated with a great variety of conditions such as composition categories as distribution targets.

Figure 4:
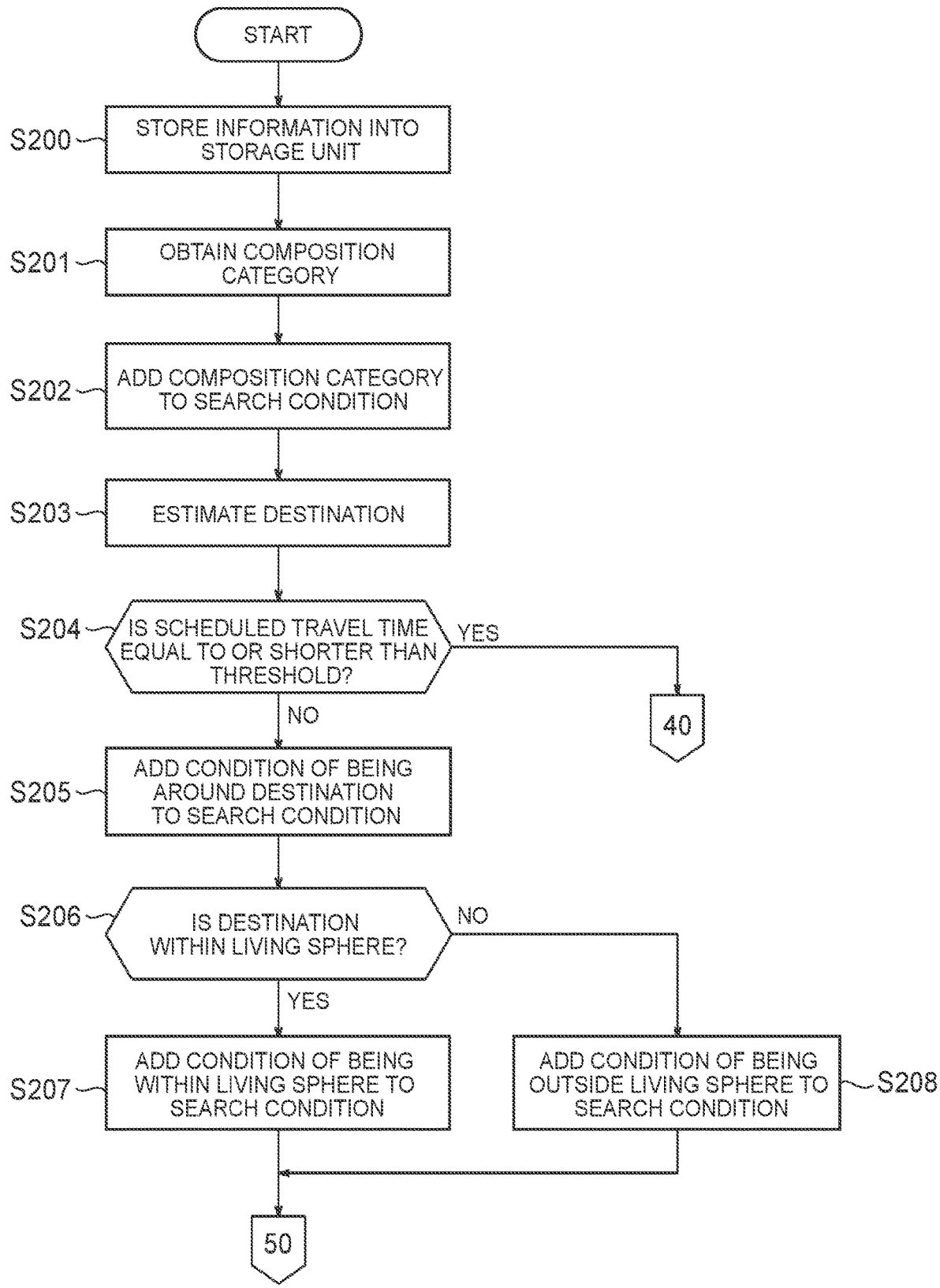
FIG. 4 is a first flowchart of an advertisement output process that is performed by a control unit of a terminal device of FIG. 1 in the second embodiment.
Figure 5:
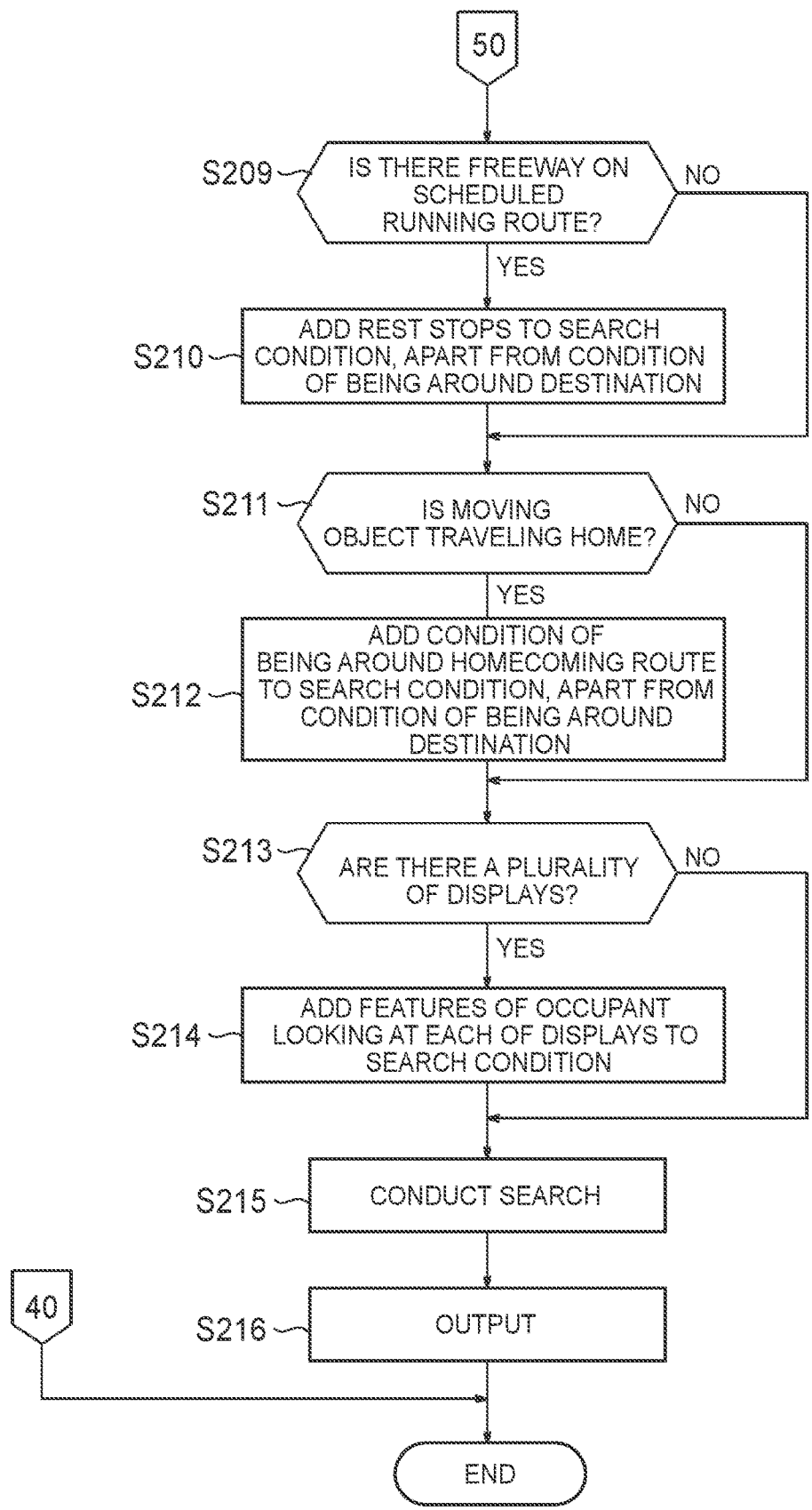
FIG. 5 is a second flowchart of the advertisement output process that is performed by the control unit of the terminal device of FIG. 1 in the second embodiment.

Next, an advertisement output process that is performed by the control unit 19 of the terminal device 12 in the second embodiment will be described through the use of flowcharts of FIGS. 4 and 5. The advertisement output process is started when information on the features of the occupants is received from the feature estimation device 20.

In step S200, the control unit 19 stores the features of the occupants into the storage unit 18. After this storage, the process proceeds to step S201.

In step S201, the control unit 19 obtains a composition category to which the composition of the occupants in the moving object 13 belongs, based on the features of the occupants stored in step S200. After the composition category is obtained, the process proceeds to step S202.

In step S202, the control unit 25 adds the composition category obtained in step S201 to a search condition for advertisements. After this addition, the process proceeds to step S203.

In step S203, the control unit 19 estimates a destination based on a user's input to the input unit 17 or a route along which the moving object has traveled. After this estimation, the process proceeds to step S204.

In step S204, the control unit 19 determines whether or not a scheduled travel time to the destination recognized in step S203 is equal to or shorter than a threshold. If the scheduled travel time is not equal to or shorter than the threshold, the process proceeds to step S205. If the scheduled travel time is equal to or shorter than the threshold, the advertisement output process is ended.

In step S205, the control unit 19 adds a condition of being around the destination estimated in step S203 to the search conditions for advertisements. After this addition, the process proceeds to step S206.

In step S206, the control unit 19 determines whether or not the destination estimated in step S203 is included in a living sphere. If the destination is included in the living sphere, the process proceeds to step S207. If the destination is not included in the living sphere, the process proceeds to step S208.

In step S207, the control unit 19 adds a condition of targeting the living sphere to the search condition for advertisements. After this addition, the process proceeds to step S209.

In step S208, the control unit 19 adds a condition of not targeting the living sphere to the search condition for advertisements. After this addition, the process proceeds to step S209.

In step S209, the control unit 19 determines whether or not a scheduled running route to the destination estimated in step S203 includes at least one freeway. If the scheduled running route includes at least one freeway, the process proceeds to step S210. If the scheduled running route does not include any freeway, the process proceeds to step S211.

In step S210, the control unit 19 adds dedicated rest stops along the freeway within the range of the scheduled running route to the search condition for advertisements, apart from the condition of being around the destination. After this addition, the process proceeds to step S211.

In step S211, the control unit 19 determines whether or not the moving object 13 is traveling home. If the moving object 13 is traveling home, the process proceeds to step S212. If the moving object 13 is not traveling home, the process proceeds to step S213.

In step S212, the control unit 19 adds a condition of being around a homecoming route to the search condition for advertisements, apart from the condition of being around the destination and the rest stops along the freeway. After this addition, the process proceeds to step S213.

In step S213, the control unit 19 determines whether or not advertisements can be output to a plurality of displays.

If advertisements can be output to the displays, the process proceeds to step S214. If advertisements cannot be output to the displays, the process proceeds to step S215.

In step S214, the control unit 19 adds the features of the occupant who recognizes information from each of the displays to the search condition for advertisements. After this addition, the process proceeds to step S215.

In step S215, the control unit 19 conducts a search for advertisements on the search condition added in at least one of steps S202, S205, S207, S208, S210, S212, and S214. After this search, the process proceeds to step S216.

In step S216, the control unit 19 causes the output unit 16 to output the advertisements found through the search in step S215. After this output, the advertisement output process is ended.

The terminal device 12 according to the second embodiment configured as described above also exerts an effect similar to that of the first embodiment.

Although the present disclosure has been described based on the various drawings and the embodiments, it should be noted that those skilled in the art can easily make various modifications and corrections based on the present disclosure. Accordingly, it should be noted that these modifications and corrections fall within the scope of the present disclosure. For example, the respective components, the functions included in the respective steps, or the like can be rearranged such that no logical contradiction occurs. A plurality of means, steps, or the like can be combined into one means, step, or the like, or can be divided.

For example, in each of the foregoing embodiments, part of the processing operation that is performed in the information processing device 10 and the terminal device 12 may be performed in other devices.

For example, although the terminal device 12 performs the process of transmitting occupant composition information to the information processing device 10, and the process of outputting advertisements received from the information processing device 10, these processes may be performed by separate terminal devices respectively. For example, the terminal device for transmitting information may transmit occupant composition information, and the terminal device for outputting advertisements may output the advertisements received from the information processing device 10. In this configuration, the information processing device 10 may receive occupant composition information from the terminal device for transmitting information, and may transmit advertisements to the terminal device for outputting advertisements. The information processing device 10 may be notified of the terminal device for outputting advertisements, for example, through the transmission of identification information on terminal devices registered in the terminal device for transmitting information and terminal devices that communicate with the terminal device for transmitting information.

Besides, it is also possible to adopt a configuration in which, for example, a general-purpose electronic device such as a smartphone, a computer, or the like is caused to function as the information processing device 10 and the terminal device 12 according to each of the foregoing embodiments. In concrete terms, a program describing the processing contents for realizing respective functions of the information processing device 10, the terminal device 12, and the like according to each of the embodiments is stored into a memory of the electronic device, and is read out to be executed by a processor of the electronic device. Accordingly, the disclosure according to each of the present embodiments can also be realized as a program that can be executed by a processor. The program may be downloaded via the network 14, or may be stored into a transportable, non-transient recording/storage medium readable by the electronic device, and read out from the medium by the electronic device.

What is claimed is:

1. An information processing system comprising:
a terminal device provided in a vehicle,
a camera provided in the vehicle configured to obtain an image that includes an occupant in the vehicle and configured to communicate with the terminal device,
a global position system (GPS) receiver in the vehicle configured to obtain a position of the terminal device, and
an information processing device configured to communicate with the terminal device, wherein:
the information processing device includes one or more processors programmed to:
store, in a storage unit, a plurality of advertising information in association with a plurality of composition categories of occupants;
identify features of the occupant in the vehicle based on the obtained image from the camera and obtain a composition of occupants in the vehicle;
generate occupant composition information of the obtained composition of occupants in the vehicle; and
obtain, from the GPS receiver, a scheduled travel time to a destination for the occupants in the vehicle,
determine at least one composition category, from among the plurality of composition categories stored in the storage unit, to which the composition of occupants in the vehicle belong, based on the occupant composition information of the composition of the occupants in the vehicle,
extract, from the storage unit, advertising information, from among the plurality of advertising information stored in the storage unit, that corresponds to the at least one composition category to which the composition of occupants in the vehicle belong,
transmit said extracted advertising information to the terminal device;
display the extracted advertising information on a display that is viewable by the occupants in the vehicle;
determine whether the scheduled travel time to the destination obtained from the GPS receiver is equal to or shorter than a threshold; and
stop the transmission of the extracted advertising information and the display of the extracted advertising information on the display, when the scheduled travel time to the destination is equal to or shorter than the threshold.

2. The information processing system according to claim 1, wherein
the extracted advertisement is an advertisement corresponding to the destination of the vehicle.

3. The information processing system according to claim 2, wherein
the extracted advertisement is an advertisement that differs depending on whether or not the destination is within a living sphere of the occupants of the vehicle.

4. The information processing system according to claim 2, wherein
the extracted advertisement is an advertisement on a dedicated rest stop for a freeway within a range of a scheduled running route to the destination, when the scheduled running route includes the freeway.

5. The information processing system according to claim 1, wherein
the extracted advertisement is an advertisement for causing each of a plurality of displays of the vehicle to output information based on information indicating features of each of the occupants who recognizes the information output from each of the displays.

6. The information processing system according to claim 1, wherein
the extracted advertisement is an advertisement around a homecoming route, when the vehicle is traveling home.

7. A non-transitory computer-readable recording medium having recorded thereon a program to be executed by a computer, the program, when executed by the computer causes the computer to:
store, in a storage unit, a plurality of advertising information in association with a plurality of composition categories of occupants;
identify features of an occupant in a vehicle based on an obtained image from a camera in the vehicle and obtain a composition of occupants in the vehicle;
generate occupant composition information of the obtained composition of occupants in the vehicle;
obtain, from a GPS receiver, a scheduled travel time to a destination for the occupants in the vehicle;
determine at least one composition category, from among the plurality of composition categories stored in the storage unit, to which the composition of occupants in the vehicle belong, based on the occupant composition information of the composition of the occupants in the vehicle;
extract, from the storage unit, advertising information, from among the plurality of advertising information stored in the storage unit, that corresponds to the at least one composition category to which the composition of occupants in the vehicle belong;
display said extracted advertising information on a display that is viewable by the occupants in the vehicle;
determine whether the scheduled travel time to the destination obtained from the GPS receiver is equal to or shorter than a threshold; and
stop the display of the extracted advertising information on the display when the scheduled travel time to the destination is equal to or shorter than the threshold.

8. The non-transitory computer-readable recording medium according to claim 7, wherein
the extracted advertisement corresponds to the destination of the vehicle.

9. The non-transitory computer-readable recording medium according to claim 8, wherein the extracted advertisement differs depending on whether or not the destination is within a living sphere of the occupants.

10. The non-transitory computer-readable recording medium according to claim 8, wherein the extracted advertisement corresponds to a dedicated rest stop for a freeway within a range of a scheduled running route to the destination, when the scheduled running route includes the freeway.

11. The non-transitory computer-readable recording medium according to claim 7, wherein the extracted advertisement is an advertisement for causing each of a plurality of displays of the moving object to output information based on information indicating features of each of the occupants who recognizes the information output from each of the displays, and causing each of the displays to display the advertisement.

12. An information processing method that is carried out by a computer comprising:

storing, in a storage unit, a plurality of advertising information in association with a plurality of composition categories of occupants;

identifying features of an occupant in a vehicle based on an obtained image from a camera in the vehicle and obtaining a composition of occupants in the vehicle;

generating occupant composition information of the obtained composition of occupants in the vehicle;

obtaining, from a GPS receiver, a scheduled travel time to a destination for the occupants in the vehicle;

determining at least one composition category, from among the plurality of composition categories stored in the storage unit, to which the composition of occupants in the vehicle belong, based on the occupant composition information of the composition of the occupants in the vehicle;

extracting, from the storage unit, advertising information, from among the plurality of advertising information stored in the storage unit, that corresponds to the at least one composition category to which the composition of occupants in the vehicle belong, displaying said extracted advertising information on a display that is viewable by the occupants in the vehicle;

determining whether the scheduled travel time to the destination obtained from the GPS receiver is equal to or shorter than a threshold; and stopping the display of the extracted advertising information on the display when the scheduled travel time to the destination is equal to or shorter than the threshold.

13. The information processing method according to claim 12, wherein
the extracted advertisement is an advertisement corresponding to the destination of the vehicle.

14. The information processing method according to claim 13, wherein the extracted advertisement is an advertisement that differs depending on whether or not the destination is within a living sphere of the occupants.

15. The information processing method according to claim 13, wherein
the extracted advertisement is an advertisement on a dedicated rest stop for a freeway within a range of a scheduled running route to the destination, when the scheduled running route includes the freeway.

16. The information processing method according to claim 12, wherein
the extracted advertisement is an advertisement for causing each of a plurality of displays of the moving object to output information based on information indicating features of each of the occupants who recognizes the information output from each of the displays.

* * * * *